United States Patent
Klipper et al.

(10) Patent No.: US 8,399,528 B2
(45) Date of Patent: Mar. 19, 2013

(54) METHOD FOR IMPROVED REMOVAL OF CATIONS BY MEANS OF CHELATING RESINS

(75) Inventors: Reinhold Klipper, Köln (DE); Stefan Neumann, Leverkusen (DE); Jens Stoll, Leverkusen (DE); Michael Schelhaas, Köln (DE); Pierre Vanhoorne, Monheim (DE)

(73) Assignee: LANXESS Deutschland GmbH, Leverkusen (DE)

( * ) Notice: Subject to any disclaimer, the term of this patent is extended or adjusted under 35 U.S.C. 154(b) by 306 days.

(21) Appl. No.: 12/890,772

(22) Filed: Sep. 27, 2010

(65) Prior Publication Data

US 2011/0132844 A1 Jun. 9, 2011

(30) Foreign Application Priority Data

Sep. 30, 2009 (DE) .......................... 10 2009 047 847

(51) Int. Cl.
*B01J 41/14* (2006.01)
*B01J 49/00* (2006.01)
*B01J 39/20* (2006.01)
*C08F 8/32* (2006.01)

(52) U.S. Cl. ............ 521/32; 521/30; 521/33; 521/25; 525/375

(58) Field of Classification Search .............. 521/32, 521/30, 33, 25; 525/375
See application file for complete search history.

(56) References Cited

U.S. PATENT DOCUMENTS

| 4,382,124 | A | | 5/1983 | Meitzner et al. |
| 4,419,245 | A | | 12/1983 | Barrett et al. |
| 4,427,794 | A | | 1/1984 | Lange et al. |
| 4,444,961 | A | | 4/1984 | Timm |
| 4,818,773 | A | | 4/1989 | Cornette et al. |
| 4,895,905 | A | | 1/1990 | Schneider et al. |
| 5,231,115 | A | | 7/1993 | Harris |
| 6,649,663 | B1 | * | 11/2003 | Klipper et al. .................. 521/32 |
| 2009/0045137 | A1 | * | 2/2009 | Klipper et al. ................ 210/684 |

OTHER PUBLICATIONS

Klipper R.M.; Ion Exchange Advance, Proceedings of IEX 92, Elevier Applied Science, London, 1992, pp. 414ff.
Anonymous; "Lewatit TP 208", Product Information, Jan. 1, 2002; URL http://www.tes-water.de/fileadmin/user_upload/pdf_downloads/TP_208D.pdf.
Westermarck, Sari; "Use of Mercury Porosimetry and Nitrogen Adsorption in Characterisation of the Pore Structure of Mannitol and Microcrystalline Cellulose Powders, Granules and Tablets", Nov. 8, 2000; URL http://ethesis.helsinki.fi/julkaisut/mat/farma/vk/westermarck/useofmer.pdf.
European Search Report from co-pending Application EP10180584 dated Feb. 8, 2011, 11 pages.

* cited by examiner

*Primary Examiner* — Michael M Bernshteyn
(74) *Attorney, Agent, or Firm* — Nicanor A. Kohncke

(57) ABSTRACT

The present invention relates to a method for improved removal of cations, preferably alkaline earth metals, in particular calcium and barium, from aqueous solutions using chelating resins having acetic acid and/or iminodiacetic acid groups having high dynamic absorption capacity for cations at a low residual content of the cations and high regeneration efficiency, to the chelating exchangers themselves, and also to uses thereof.

9 Claims, 2 Drawing Sheets

METHOD FOR IMPROVED REMOVAL OF CATIONS BY MEANS OF CHELATING RESINS

The present invention relates to a method for improved removal of cations, preferably alkaline earth metals, in particular calcium and barium, from aqueous solutions using chelating resins having acetic acid and/or iminodiacetic acid groups having high dynamic absorption capacity for cations with low residual content of cations and high regeneration efficiency, to the chelating exchangers themselves, and also to uses thereof.

The chelating exchangers according to the invention exhibit a high dynamic absorption capacity for cations, preferably for divalent cations, in particular for barium, from aqueous alkali metal salt solutions, wherein the chelating resins exhibit a high functionality utilization degree of the functional groups and a high regeneration efficiency with simultaneously high bead stability.

In the context of the present invention, the expression chelating resin also means chelating ion exchangers or chelating exchangers or ion exchangers having chelating functional groups. For clarification it may be noted that the context of the invention encompasses all definitions and parameters listed hereinafter, in general or indicated in preferred ranges, in any desired combinations.

BACKGROUND OF THE INVENTION

Sodium hydroxide solution and chlorine gas are important base chemicals which are produced in large amounts. The modern methods for production of sodium hydroxide solution and chlorine are based on the electrolysis of aqueous sodium chloride solutions by the membrane method. The electrolysis procedure which is associated with high energy consumption proceeds at the membranes. These membranes are about 0.1 mm-thick, chlorine-resistant cation-exchanger membranes which consist of polytetrafluoroethene (PTFE/Teflon) having negatively charged $SO_3$ substituents (Nafion). The anions formed in the electrolysis such as $OH^-$ or $Cl^-$ cannot pass through them, whereas the positively charged $Na^+$ ions can pass through these membranes. Owing to the impermeability to $Cl^-$ ions, a 35% strength sodium hydroxide solution is formed which is virtually uncontaminated by sodium chloride.

The negatively charged $SO_3$ groups of the membranes can absorb, in particular, divalent cations such as calcium, magnesium, strontium, barium and others. Precipitates occur on the membranes which subsequently then become blocked. As a result, the performance of the membranes decreases. The yield of the reaction of sodium chloride to give chlorine and sodium hydroxide solution decreases, falling current densities and increasing cell voltages are the consequence and, thereby, a higher specific energy consumption. At the same time, likewise, the service life of the membranes—until they must be replaced—decreases.

It is therefore absolutely necessary to provide a sodium chloride brine for the electrolysis procedure at the membranes, which brine is as free as possible of other cations except for sodium.

Producers of membranes give the following recommendations for purified sodium chloride brines for the residual concentrations of cations which the maximum which should be present in the brine after the precipitation and also fine purification with chelating resins (Bayer SP IOW 4006e, 2001-01).

Calcium 2+; magnesium 2+: <20 ppb
Strontium 2+: <100 ppb
Barium 2+: <500 ppb

The sodium chloride delivered by the manufacturers, when dissolved in water to give a sodium chloride brine, does not meet these high purity requirements.

The sodium chloride used as feed stock is a natural product which can contain, in addition to sodium chloride, a further up to 85 chemical elements. In addition, the content of sodium chloride varies considerably in the natural product sodium chloride.

The sodium chloride delivered which is used for obtaining chlorine and sodium hydroxide solution in electrolysis methods, should have a content of at least approximately 97% by weight of NaCl.

Depending on origin, sodium chloride additionally contains differing amounts of divalent and higher valent cations such as the abovementioned cations and also, in traces, zinc, cobalt, iron, nickel, chromium, copper, potassium inter alia, and also various anions.

For example, an analysis of the most important minerals of the natural rock salt of the Zechstein age which were formed approximately 280 million years ago by drying out of the sea, carried out by Geo-Anal-Speck in Krakow in 1991 using the spectrophotometric method (AAS) showed a content of 0.271 ppm of Ca, 0.03 ppm of Mg, 4.1 ppm of Zn, 142 ppm of Fe, 2.7 ppm of Co, 432 ppm of Ni, 0.34 ppm of Cu, 0.09 ppm of Cr and also 6.8 ppm of Mn, based on 100 g of salt. Independently of the alkaline earth metals, said heavy metals can lead to damage to the electrodes used during the electrolysis procedure, preferably the gas diffusion electrodes used today.

The concentration of sodium chloride in the aqueous sodium chloride solution which is used for the electrolysis is in the range of 250-330 grammes of NaCl per liter of solution.

In particular, the concentration of divalent cations should be removed for the above-mentioned reasons before the electrolysis procedure as quantitatively as possible, since they adversely affect the electrolysis procedure.

Therefore, even now an aqueous sodium chloride solution to be used in alkali metal chloride electrolysis is purified in two steps before the electrolysis; in a first step, by precipitation, a relatively large amount of the divalent cations are removed. Their concentration in the aqueous brines after precipitation is then in the range from approximately 0.1 to approximately 20 ppm. In a second step, the concentration, in particular of the divalent cations calcium, magnesium, strontium, barium in the brine is reduced by overfiltration over chelating exchangers to residual values in the aqueous effluent out of the column, depending on cation type, of below approximately 500 ppb to approximately 20 ppb.

If the concentration of divalent cations, individually or in sum, exceeds the said values in the column eluate, the column is regenerated.

The selectivity of chelating ion exchangers for removing the divalent cations calcium, magnesium, strontium, barium from sodium chloride brines differs. The following sequence results in decreasing selectivity: magnesium>calcium>>strontium>barium>alkali metals (Na). Barium ions are therefore absorbed markedly more poorly than magnesium ions and calcium ions.

The producers of the membranes take this into account in such a manner that they recommend the abovementioned differing residual values in the purified brine for the divalent cations calcium, magnesium, strontium, barium.

The purpose must therefore be to develop a chelating resin having improved selectivity which, in addition to a generally high absorption capacity for divalent cations, in particular displays a high absorption capacity for cations such as barium.

The amount of divalent cations which the chelating resin has absorbed until it exceeds the concentration greater than the limiting value which, for calcium and magnesium, is 20 ppb of cations in the aqueous effluent of the chelating resin, is in this case called the dynamic absorption capacity of the chelating resin.

The brine thus purified is converted electrolytically to sodium hydroxide solution and chlorine—see R. M. Klipper, H. Hoffmann, T. Augustin, Ion Exchange Advances, Proceedings of IEX 92, pages 414 ff.; Elsevier Applied Science, London, 1992.

If the chelating ion exchanger is loaded with the above-mentioned cations such as calcium, magnesium, strontium, barium, to the extent that the cations can no longer be sufficiently removed and in the eluate values of calcium and magnesium >20 ppb are measured, the chelating ion exchanger must be regenerated with acids, preferably hydrochloric acid. The chelating groups are converted to the hydrogen form. Then, the chelating resin is converted by means of aqueous sodium hydroxide solution into the sodium form of the chelating groups and can then again remove divalent cations from the brine.

Chelating ion exchangers having a high dynamic absorption capacity for divalent cations such as calcium, magnesium, strontium, barium from aqueous salt brines, in particular sodium chloride brines, for low residual values of cations in the purified solution, a high degree of utilization of the functional groups during loading, and also high regeneration efficiency with simultaneously high bead stability of the chelating resins, are sought.

In U.S. Pat. No. 4,818,773, chelating resins having iminodiacetic acid groups are described and their absorption capacity for cations such as calcium and magnesium from sodium chloride brines is tested in the brine test.

The dynamic absorption capacity thereof for calcium ions was determined. In the case of Amberlite® XE 318, a chelating resin with iminodiacetic acid groups, it is 7.1 grammes of calcium per liter of resin. 520 bed volumes of brine were filtered through the chelating resin in 26 hours—at a rate of 20 bed volumes (BV) per hour.

The concentration of calcium in the purified brine is 20 ppb, the loading of the chelating resin with sodium chloride brine was ended when the calcium concentration is >500 ppb in the effluent of the chelating resins.

DE 3 704 307 A1 describes chelating resins having iminodiacetic acid groups and their dynamic absorption capacity for cations such as calcium and magnesium from sodium chloride brines was tested in the brine test.

The dynamic absorption capacity thereof for calcium ions was determined. For Lewatit OC 1048 from Bayer AG, a macroporous chelating resin having iminodiacetic acid groups, it is 4.2 grammes of calcium per liter of resin, Example 2.

The calcium concentration in the purified brine is for the majority of the loading cycle <20 ppb, and the loading of the chelating resin with sodium chloride brine is terminated when the calcium concentration is >50 ppb in the effluent of the chelating resins.

EP 1 078 690 A2 discloses a method for producing monodisperse ion exchangers having chelating groups, wherein, as chelating groups, $(CH_2)_n-NR_1R_2$ are present in the ion exchanger and $R_1$ is inter alia H, $CH_2-COOH$ and $R_2$ is inter alia $CH_2-COOH$ and n is an integer between 1 and 4.

The chelating resins described in the prior art do not meet the requirements for fine purification of salt brines in the currently used membrane electrolysis methods. The residual amount of calcium in the purified brine in U.S. Pat. No. 4,818,773 is 20 ppb. The residual amount of calcium in the purified brine in DE 3 704 307 A1 is only at times <20 ppb. In addition, the amount of absorbed calcium is not sufficiently high, and so in U.S. Pat. No. 4,818,773 the loading is terminated as soon as after 26 hours and then regeneration must proceed. In long-term operation, the chelating resin must therefore be regenerated several hundred times per year. The chelating resins of EP 1 078 690 A2, in particular with the simultaneous presence of calcium and barium, do not display the barium selectivity required for current-day membrane processes.

The object of the present invention is therefore the provision of novel chelating exchangers for markedly better removal
- of alkaline earth metals such as magnesium, calcium, strontium and in particular barium in the simultaneous presence of calcium, from aqueous brines, as customarily occur in chloralkali electrolysis,
- of heavy metals and noble metals from aqueous solutions or organic liquids or vapours thereof, particularly of mercury from aqueous solutions of alkaline earth metals and alkali metals, in particular a removal of mercury from brines or alkali metal chloride electrolysis.

SUMMARY OF THE INVENTION

The present invention relates to a method for producing monodisperse ion exchangers having chelating functional groups represented by the structural element (I)

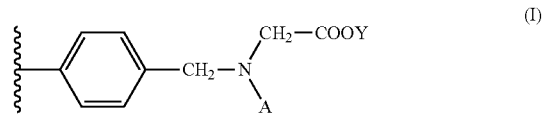

where ~~~ is the polymer backbone and is hydrogen, sodium or potassium and A is hydrogen, $CH_2COONa$, $CH_2COOH$ or $CH_2COOK$,
characterized in that
a) monomer droplets of at least one monovinylaromatic compound and at least one polyvinylaromatic compound and also at least one porogen and at least one initiator or an initiator combination are reacted by the jetting principle or the seed-feed principle to form monodisperse crosslinked polymer beads,
b) the monodisperse crosslinked polymer beads are phthalimidomethylated with phthalimide derivatives by introducing a subportion of 1 to 15% by weight of the polymer beads into the $SO_3$ adduct of the phthalimide derivative present in inert solvent and stirring at a temperature of ≦35° C. for 1 to 15 hours, wherein the amount of free $SO_3$ is 0.28 to 0.5 mol based on 1 mol of phthalimide and thereafter the residual amount of polymer beads is introduced at a temperature of 30-75° C. into the $SO_3$ adduct of the phthalimide derivative present in inert solvent,
c) the phthalimidomethylated polymer beads are converted to aminomethylated polymer beads and
d) the aminomethylated polymer beads are reacted to form ion exchangers having chelating functional groups.

Surprisingly, by means of the method according to the invention, chelating resins having acetic acid and/or iminodiacetic acid groups may be generated which surpass the prior art by an exceedingly high total capacity.

The present invention therefore also relates to monodisperse ion exchangers having chelating functional groups of the structural element (I)

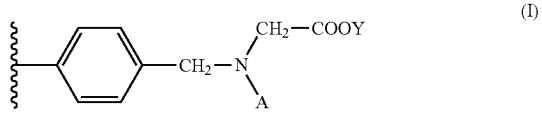

where ⌇⌇⌇ is the polymer backbone and Y is hydrogen, sodium or potassium and A is hydrogen, CH$_2$COONa, CH$_2$COOK or CH$_2$COOH,
having a total capacity TC of 2.7 to 3.2 mol/l and a median pore diameter of 75 to 90 nm, preferably obtainable by
a) reacting monomer droplets of at least one monovinylaromatic compound and at least one polyvinylaromatic compound and also at least one porogen and at least one initiator or an initiator combination by the jetting principle or the seed-feed principle to form monodisperse crosslinked polymer beads,
b) phthalimidomethylating the monodisperse crosslinked polymer beads with phthalimide derivatives by introducing a subportion of 1 to 15% by weight of the polymer beads into the SO$_3$ adduct of the phthalimide derivative present in inert solvent and stirring at a temperature of ≦35° C. for 1 to 15 hours, wherein the amount of free SO$_3$ is 0.28 to 0.5 mol based on 1 mol of phthalimide and thereafter introducing the residual amount of polymer beads at a temperature of 30-75° C. into the SO$_3$ adduct of the phthalimide derivative present in inert solvent,
c) converting the phthalimidomethylated polymer beads to aminomethylated polymer beads and
d) reacting the aminomethylated polymer beads to form ion exchangers having chelating functional groups.

In a preferred embodiment, in the structural element (I), Y is hydrogen or sodium and A is hydrogen, CH$_2$COOH or CH$_2$COONa.

DESCRIPTION OF THE INVENTION

Figure 1:
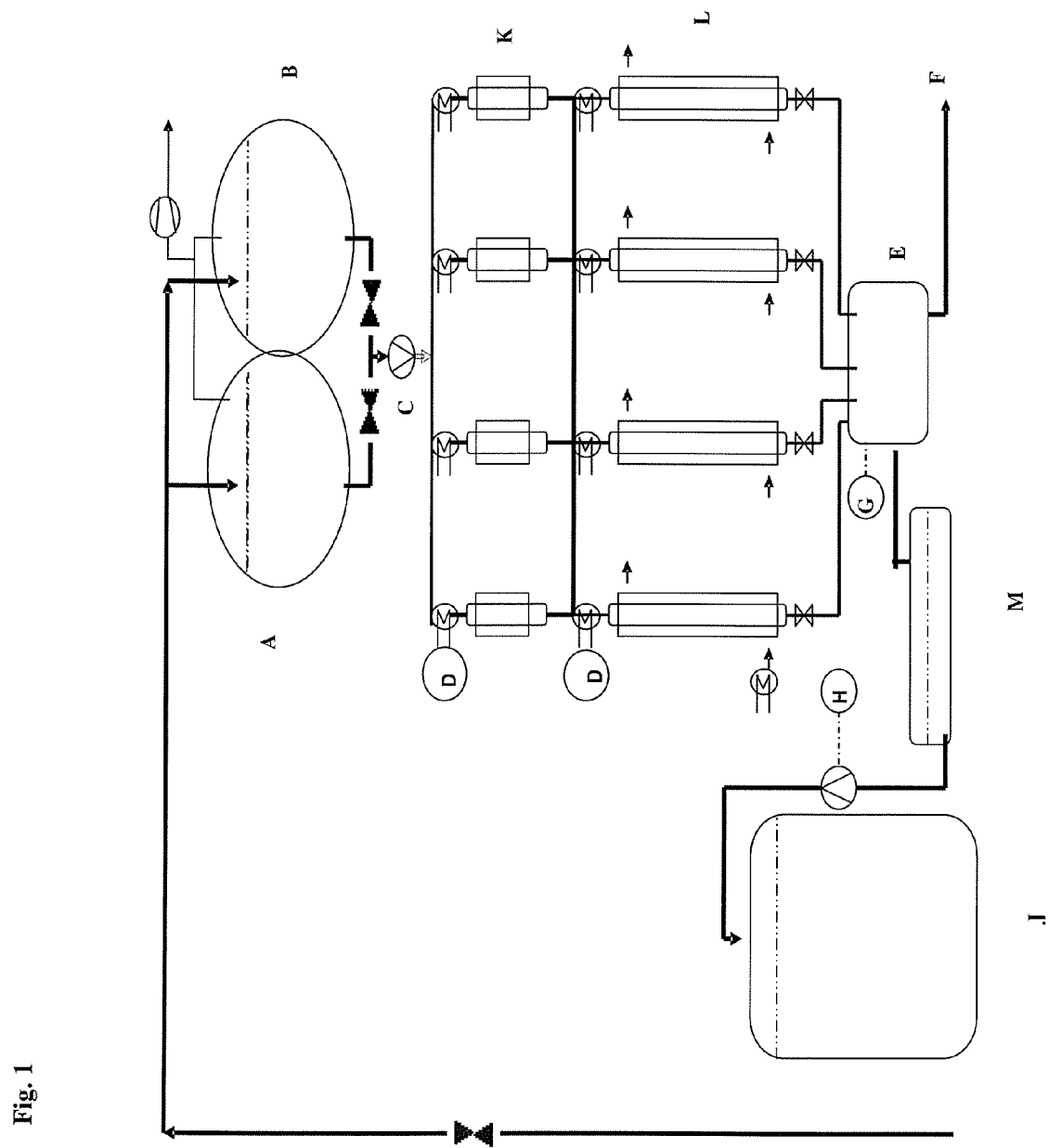
FIG. 1 schematically illustrates an apparatus according to the Examples below for continuously pumping brine over an ion exchanger.

In a preferred embodiment, the chelating exchangers according to the invention have a porosity of 52 to 65%. In a further preferred embodiment, the chelating exchangers according to the invention have a median bead diameter of 240 to 480μ. In a further preferred embodiment, the chelating exchangers according to the invention have a pore volume of 700 to 950 mm$^3$/g. In a further preferred embodiment, the chelating exchangers according to the invention have a median pore diameter of 75 to 90 nm.

In addition, they have a production-related monodisperse particle size distribution.

Substances termed monodisperse in the present application are those substances in which at least 90% by volume or by mass of the particles have a diameter which is in the interval having the width of ±10% of the most frequent diameter around the most frequent diameter.

For example, in the case of a substance having the most frequent diameter of 0.5 mm, at least 90% by volume or by mass are in a size interval between 0.45 mm and 0.55 mm, in the case of a substance having the most frequent diameter of 0.7 mm, at least 90% by volume or by mass are in a size interval between 0.77 mm and 0.63 mm.

Median bead diameters according to the invention are in the range from 240 to 480μ, preferably from 250 to 450μ. The monodispersity of the chelating exchangers according to the invention is process-related, in that the polymer bead precursor, that is to say the monodisperse crosslinked vinylaromatic base polymer, is produced by the jetting principle or the seed-feed principle. With regard thereto, reference may be made to the prior art in U.S. Pat. No. 4,444,961, EP-A 0 046 535, U.S. Pat. No. 4,419,245 or WO 93/12167, the contents whereof are hereby incorporated by the present application with respect to process step a) of the present application.

The chelating resins according to the invention having acetic acid and/or iminodiacetic acid groups and having the above-described properties are obtained without a post-crosslinking taking place. They exhibit, compared with the prior art, markedly better removal of alkaline earth metals such as magnesium, calcium, barium or strontium from aqueous brines as customarily occur in the chloralkali electrolysis and, moreover, a markedly improved selectivity towards barium with simultaneously markedly improved calcium absorption, and also an improved adsorption capacity towards the abovementioned heavy metals that occur in traces in rock salt brines.

The chelating resins having acetic acid and/or diaminoacetic acid groups according to the invention are therefore outstandingly suitable for the most varied fields of use in the chemical industry, the electronics industry, the waste disposal/utilization industry or the electroplating or surface-treating technologies, but in particular for purifying brines for alkali metal electrolysis.

Furthermore, they serve for protecting the gas diffusion electrodes currently used in the chloralkali electrolysis, in particular oxygen consumption electrodes, by very substantially freeing the brines from heavy metals.

In process step a), at least one monovinylaromatic compound and at least one polyvinylaromatic compound are used. However, it is also possible to use mixtures of two or more monovinylaromatic compounds and mixtures of two or more polyvinylaromatic compounds.

Monovinylaromatic compounds in the context of the present invention preferably used in process step a) are monoethylenically unsaturated compounds, particularly preferably styrene, vinyltoluene, ethylstyrene, α-methylstyrene, chlorostyrene, chloromethylstyrene, alkyl esters of acrylic acid or alkyl esters of methacrylic acid.

Especially preferably, styrene or mixtures of styrene with the abovementioned monomers are used.

Preferred polyvinylaromatic compounds in the context of the present invention are, for process step a), multifunctional ethylenically unsaturated compounds, particularly preferably divinylbenzene, divinyltoluene, trivinylbenzene, divinylnapthalene, trivinylnaphthalene, 1,7-octadiene, 1,5-hexadiene, ethylene glycol dimethacrylate, trimethylolpropane trimethacrylate or allyl methacrylate, especially preferably divinylbenzene.

The polyvinylaromatic compounds are preferably used in amounts of 1-20% by weight, particularly preferably 2-12% by weight, especially preferably 4-10% by weight, based on the monomer or mixture thereof with other monomers. The type of polyvinylaromatic compounds (crosslinkers) is selected with regard to the later use of the spherical polymer.

In the case of the use of divinylbenzene, commercial divinylbenzene qualities which, in addition to the isomers of divinylbenzene, also contain ethylvinylbenzene, are adequate.

In a preferred embodiment of the present invention, in process step a), microencapsulated monomer droplets are used.

For the microencapsulation of the monomer droplets, the materials known for use as complex coacervates come into consideration, in particular polyesters, natural and synthetic polyamides, polyurethanes or polyureas.

As a natural polyamide, preferably gelatin is used. This is used, in particular, as a coacervate and complex coacervate. Gelatin-containing complex coacervates in the context of the invention are taken to mean, especially, combinations of gelatin with synthetic polyelectrolytes. Suitable synthetic polyelectrolytes are copolymers having incorporated units of, for example, maleic acid, acrylic acid, methacrylic acid, acrylamide and methacrylamide. Particularly preferably, acrylic acid and acrylamide are used. Gelatin-containing capsules can be cured with conventional curing agents such as, for example, formaldehyde or glutardialdehyde. The encapsulation of monomer droplets with gelatin, gelatin-containing coacervates and gelatin-containing complex coacervates is described in detail in EP-A 0 046 535. The methods of encapsulation with synthetic polymers are known. Preference is given to phase boundary condensation in which a reactive component (in particular an isocyanate or an acid chloride) dissolved in the monomer droplet is reacted with a second reactive component (in particular an amine) dissolved in the aqueous phase.

The optionally microencapsulated monomer droplets contain at least one initiator or mixtures of initiators for starting the polymerization. Preferred initiators for the method according to the invention are peroxy compounds, especially preferably dibenzoyl peroxide, dilauroyl peroxide, bis(p-chlorobenzoyl)peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane or tert-amylperoxy-2-ethylhexane, and also azo compounds such as 2,2'-azobis(isobutyronitrile) or 2,2'-azobis(2-methylisobutyronitrile).

The initiators are preferably used in amounts of 0.05 to 2.5% by weight, particularly preferably 0.1 to 1.5% by weight, based on the monomer mixture.

The expressions microporous or gel-type or macroporous have already been described in detail in the specialist literature.

Monodisperse macroporous polymer beads are formed by adding inert materials, preferably at least one porogen, to the monomer mixture in the polymerization, in order to generate a macroporous structure in the spherical polymer. Organic solvents which dissolve or swell the resultant polymer poorly are suitable therefor. Especially preferred porogens are hexane, octane, isooctane, isododecane, methyl ethyl ketone, butanol or octanol and isomers thereof. Organic substances are especially suitable which dissolve in the monomer but dissolve or swell the polymer poorly (precipitant for polymers), for example aliphatic hydrocarbons (Farbenfabriken Bayer DBP1045102, 1957; DBP 1113570, 1957).

In U.S. Pat. No. 4,382,124, as porogen, the alcohols having 4 to 10 carbon atoms which are likewise to be used with preference in the context of the present invention, are used for producing monodisperse macroporous polymer beads based on styrene/divinylbenzene. In addition, a survey of the production methods of macroporous polymer beads is given.

Polymer beads to be used in the context of the present invention, produced by process step a), therefore have, owing to the use of porogen, a macroporous structure.

The optionally micro-encapsulated monomer droplets can optionally also contain up to 30% by weight (based on the monomer) of crosslinked or uncrosslinked polymer. Preferred polymers are derived from the abovementioned monomers, particularly preferably from styrene.

The median particle size of the optionally encapsulated monomer droplets in step a) is 10-380 µm, preferably 100-330 µm. The median particle size of the monodisperse polymer beads obtained from the encapsulated monomer droplets in process step a) is 10-350 µm, preferably 100-300 µm.

In the production of the monodisperse polymer beads according to process step a), the aqueous phase, in a further preferred embodiment, can contain a dissolved polymerization inhibitor. Inhibitors which come into consideration in the context of the present invention are inorganic and organic substances. Preferred inorganic inhibitors are nitrogen compounds, especially preferably hydroxylamine, hydrazine, sodium nitrite and potassium nitrite, salts of phosphorous acid such as sodium hydrogenphosphite and also sulphur compounds such as sodium dithionite, sodium thiosulphate, sodium sulphite, sodium bisulphite, sodium rhodanide and ammonium rhodanide. Examples of organic inhibitors are phenolic compounds such as hydroquinone, hydroquinone monomethyl ether, resorcinol, pyrocatechol, tert-butylpyrocatechol, pyrogallol and condensation productions of phenols with aldehydes. Further preferred organic inhibitors are nitrogenous compounds. Especial preference is given to hydroxylamine derivatives such as, for example N,N-diethylhydroxylamine, N-isopropylhydroxylamine and also sulphonated or carboxylated N-alkylhydroxylamine derivatives or N,N-dialkylhydroxylamine derivatives, hydrazine derivatives such as, for example N,N-hydrazinodiacetic acid, nitroso compounds such as, for example N-nitrosophenylhydroxylamine, N-nitrosophenylhydroxylamine ammonium salt or N-nitrosophenylhydroxylamine aluminium salt. The concentration of the inhibitor is 5-1000 ppm (based on the aqueous phase), preferably 10-500 ppm, particularly preferably 10-250 ppm.

The polymerization of the optionally microencapsulated monomer droplets to give the spherical monodisperse polymer beads proceeds, as already mentioned above, optionally or preferably in the presence of one or more protective colloids in the aqueous phase. Suitable protective colloids are natural or synthetic water-soluble polymers, preferably gelatin, starch, poly(vinyl alcohol), polyvinylpyrrolidone, polyacrylic acid, polymethacrylic acid or copolymers of (meth)acrylic acid and esters of (meth)acrylic acid. Preference is further given to cellulose derivatives, in particular cellulose esters and cellulose ethers, such as carboxymethylcellulose, methyl hydroxyethylcellulose, methyl hydroxypropylcellulose and hydroxyethylcellulose. Especial preference is given to gelatin. The amount of the protective colloids used is generally 0.05 to 1% by weight, based on the aqueous phase, preferably 0.05 to 0.5% by weight.

The polymerization to give the spherical, monodisperse, macroporous polymer beads in process step a) can be carried out in an alternative preferred embodiment in the presence of a buffer system. Preference is given to buffer systems which set the pH of the aqueous phase at the start of the polymerization to between 14 and 6, preferably between 12 and 8. Under these conditions, protective colloids having carboxylic acid groups are present in whole or in part as salts. In this manner, the action of the protective colloids is affected favourably. Particularly highly suitable buffer systems contain phosphate salts or borate salts. The expressions phosphate and borate in the context of the invention also comprise the condensation products of the ortho forms of corresponding acids and salts. The concentration of the phosphate or borate in the aqueous phase is 0.5-500 mmol/l, preferably 2.5-100 mmol/l.

The stirring rate during the polymerization is less critical and, in contrast to the conventional bead polymerization, has no effect on the particle size. Low stirring rates are used which are sufficient to keep the suspended monomer droplets in suspension and support the removal of the heat of polymerization. For this task, various stirrer types can be used. Particularly suitable stirrers are gate stirrers having an axial action.

The volume ratio of encapsulated monomer droplets to aqueous phase is 1:0.75 to 1:20, preferably 1:1 to 1:6.

The polymerization temperature depends on the decomposition temperature of the initiator used. It is generally between 50 and 180° C., preferably between 55 and 130° C. The polymerization takes time period from 0.5 to about 20 hours. It has proven useful to use a temperature programme in which the polymerization is started at a low temperature, for example 60° C., and the reaction temperature is increased with advancing polymerization conversion rate. In this manner, for example the requirement for a safe reaction course and high polymerization conversion rate are very readily met. After the polymerization, the polymer is isolated and optionally washed, using conventional methods, for example by filtration or decanting.

In process step b), first the amidomethylation reagent is produced. For this purpose, a phthalimide derivative is dissolved in a solvent and admixed with formalin. Subsequently, with elimination of water, a bis(phthalimido) ether is formed. The bis(phthalimido) ether can optionally be converted to the phthalimido ester. Preferred phthalimido derivatives in the context of the present invention are phthalimide itself or substituted phthalimides, preferably methyl phthalimide.

Solvents used in process step b) are inert solvents which are suitable for swelling the polymer, preferably chlorinated hydrocarbons, particularly preferably dichloroethane or methylene chloride.

In process step b) the polymer beads are condensed with phthalimide derivatives. The catalyst used in this case is oleum, sulphuric acid or sulphur trioxide in order to produce therefrom an $SO_3$ adduct of the phthalimide derivative in the inert solvent.

According to the invention a procedure is followed such that, at temperatures of 35° C., preferably 5 to 30° C., first a subquantity of the polymer beads from process step a) is introduced into the $SO_3$ adduct of the phthalimide derivative present in the inert solvent, preferably 1,2-dichloroethane. Preferably, the subquantity is 1 to 15% by weight of the total amount of the polymer beads to be processed. The amount of free $SO_3$ here is 0.28 to 0.65 mol, based on 1 mol of phthalimide which was used for formation of the phthalimide derivative.

This subquantity is then phthalimidomethylated at the abovementioned temperatures by stirring the batch over a period of 1 to 15 hours.

Thereafter the residual amount of the polymer beads to be processed is added at temperatures of 30 to 75° C., preferably 35 to 65° C.

The results of the present investigations show that the stepwise addition of polymer beads in process step b) surprisingly leads to a higher yield of chelating exchanger and simultaneously these have a higher total capacity than the prior art. This is expressed by a higher degree of phthalimidomethylation of the polymer beads (first substitution), a higher yield of the end product in ml per gramme of polymer beads used and also a functionalization degree of the chelating exchanger (second substitution) which is markedly increased compared with the prior art.

An increased functionalization degree is taken to mean that the aminomethylated polymer beads produced as intermediate from process step c) are more completely functionalized with amino/iminodiacetic acid groups (increased second substitution).

The elimination of the phthalic acid substituent and therefore the exposure of the aminomethyl group proceeds in process step c) by treating the phthalimidomethylated crosslinked polymer beads with aqueous or alcoholic solutions of an alkali metal hydroxide, such as sodium hydroxide or potassium hydroxide, at temperatures of 100 to 250° C., preferably of 120 to 190° C. The concentration of the sodium hydroxide solution is in the range from 10 to 50% by weight, preferably from 20 to 40% by weight. This method enables the production of aminoalkyl-containing crosslinked polymer beads having a substitution of the aromatic rings greater than 1.

The resultant aminomethylated polymer beads are finally washed alkali-free with demineralized water.

In process step d), the chelate exchangers according to the invention are produced by reacting the aminomethyl-containing monodisperse, crosslinked vinylaromatic base polymer in aqueous suspension with chloroacetic acid or derivatives thereof. A more particularly preferred chloroacetic acid derivative is the sodium salt of chloroacetic acid.

The sodium salt of chloroacetic acid is preferably used as aqueous solution.

The aqueous solution of the sodium salt of chloroacetic acid is metered into the charged aqueous suspension of the aminomethyl-containing base polymer in the course of 0.5 to 15 hours at the reaction temperature. Preferably, the metering is performed in the course of 5 to 11 hours.

The hydrochloric acid released on reaction of the aminomethyl-containing polymer beads with chloroacetic acid is neutralized in part or in whole by adding sodium hydroxide solution, in such a manner that the pH of the aqueous suspension during this reaction is set in the range between pH 5 and 10.5. Preferably, the reaction is carried out at pH 9.

The reaction is carried out at temperatures in the range between 50 and 100° C. Preferably, the reaction proceeds at temperatures in the range between 80 and 95° C.

As suspension medium, water or aqueous hydrochloric acid solution is used. Salts which come into consideration are alkali metal salts, in particular NaCl and sodium sulphate.

The ion exchangers according to the invention having chelating functional groups are suitable for the adsorption of metals, in particular heavy metals and noble metals and compounds thereof from aqueous solutions and organic liquids. The ion exchangers according to the invention with chelating functional groups are particularly suitable for removing heavy metals or noble metals from aqueous solutions, in particular from aqueous solutions of alkaline earth metals or alkali metals, from brines for alkali metal chloride electrolysis. Furthermore, the ion exchangers according to the invention having chelating functional groups are suitable for removing alkaline earth metals from brines, as are customarily used in alkali metal chloride electrolysis. The present invention therefore relates to the use of the chelating resins according to the invention for the adsorption of metals, where the metals are alkaline earth metals, heavy metals or noble metals.

Heavy metals and noble metals for the purposes of the present invention are mercury, iron, cobalt, nickel, copper, zinc, lead, cadmium, manganese, uranium, vanadium, elements of the platinum group and also gold or silver.

Preferably, the present invention relates to the adsorption of metals from aqueous solutions and organic liquids, wherein, particularly preferably, the aqueous solutions are solutions of alkaline earth metals or alkali metals or brines for the alkali metal chloride electrolysis, by means of the ion exchangers according to the invention having chelating functional groups.

In a preferred embodiment, the present invention relates to the use of the chelating exchangers according to the invention for removing alkaline earth metals from brines for the alkali metal chloride electrolysis, preferably of magnesium, calcium, strontium or barium, from brines for the alkali metal chloride electrolysis.

Preferably, the present invention relates to the selective removal of barium from brines for the alkali metal chloride electrolysis with simultaneously markedly improved calcium adsorption by means of the chelating resins according to the invention.

However, the present invention also relates to the use of the chelating exchangers according to the invention for protecting the membranes and electrodes, in particular gas diffusion electrodes, used in the alkali metal chloride electrolysis. This protection results from the absorption of the alkaline earth metals and heavy metals which are harmful to the membranes and electrodes.

The present invention further relates to the use of the chelating exchangers according to the invention for increasing the efficiency of membrane processes in the alkali metal chloride electrolysis. The present invention therefore also relates to a method for increasing the efficiency of alkali metal chloride electrolysis processes by adsorption of the alkaline earth metals and heavy metals which are harmful to the electrolysis process, in particular calcium and barium, and also zinc, iron, cobalt, nickel, copper, chromium and manganese, by means of the chelating exchangers according to the invention.

Demineralized water, for the purposes of the present invention, is characterized by having a conductivity of 0.1 to 10 µS, wherein the content of soluble metal ions is not greater than 1 ppm, preferably not greater than 0.5 ppm for Fe, Co, Ni, Mo, Cr, Cu as individual components and not greater than 10 ppm, preferably not greater than 1 ppm, for the sum of said metals.

Determination of the Amount of Chelating Groups—Total Capacity (TC) of the Resin A filter column is packed with 100 ml of exchanger which is eluted with 3% strength by weight hydrochloric acid in 1.5 hours. Then the column is washed with demineralized water until the effluent is neutral.

A column packed with 50 ml of regenerated ion exchanger is charged with 0.1 n sodium hydroxide solution (=0.1 normal sodium hydroxide solution). The effluent is collected in each case in a 250 ml measuring flask and the total amount is titrated against methyl orange with 1 n hydrochloric acid.

Application is continued until 250 ml of effluent have a consumption of 24.5-25 ml of 1 n hydrochloric acid. After testing is complete, the volume of the exchanger in the Na form is determined.

$$\text{Total capacity (TC)} = (X \cdot 25 - \Sigma V) \cdot 2 \cdot 10^{-2} \text{ in mol/l of exchanger.}$$

X=number of the effluent fractions
ΣV=total consumption in ml of 1 n hydrochloric acid in the titration of the effluents.

Determination of the Median Pore Diameter

The mean pore diameter and the pore size distribution are determined by Hg-porosimetry, in particular as specified by DIN 66133.

Determination of the Bead Diameter

Figure 2:
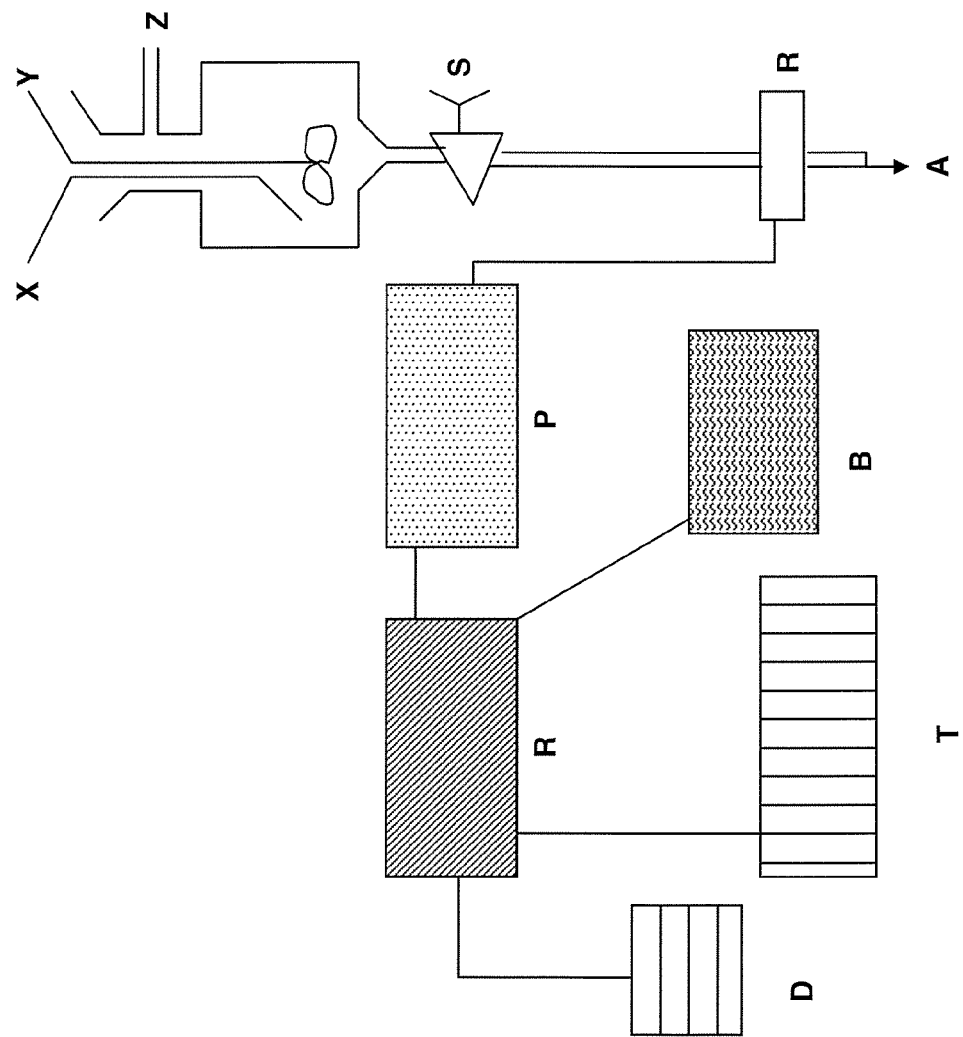
FIG. 2 schematically illustrates a measuring arrangement for determining the median bead diameter.

First, the stirred vessel is filled with 5 l of demineralized water and the stirrer set to a speed of rotation of 100 rpm (see FIG. 2).

The main cock of the stiffed vessel should then be opened and care taken to ensure that no air bubbles pass into the measuring sensor.

After programme start, in total approximately 1000 ion exchange beads are carefully added to the stirred vessel in portions of approximately 100 beads.

FIG. 2 shows by way of example a measuring arrangement for determining the median bead diameter.

In FIG. 2,
X=feed for demineralized water
Y=stirrer
Z=overflow
R=measuring sensor, HCB 250
A=effluent
P=PMT 2120 measuring counter
B=screen
R=personal computer
D=printer
S=shutoff valve
T=keyboard Manual Evaluation A manual depiction of the particle size distribution is performed by plotting the volume percent of the determined sieve fractions on a grain size grid (e.g. Selecta No. 421 1/2 A4, Schleicher & Schüll) and joining the individual plotted points to form a curve.

Abscissa: residue totals on the individual sieve in %
Ordinate: particle size in mm Against the curve obtained a straight line is placed which comes as close as possible to the original line segment. The intersections of these straight lines with the perpendiculars for 90 and 40% residue each give a value in mm.

The value for 90% residue is the effective particle size.

The value determined from the graph for 40% residue divided by the effective particle size gives the uniformity coefficient.

First the stirred vessel is filled with 5 l of demineralized water and the stirrer set to a speed of rotation of 100 rpm. The PMT apparatus, the electronic data processing unit and the printer are then operated in accordance with the PMT-2120 operating handbook and the PAMAS software (Version 2.11).

The main cock of the stirred vessel must then be opened and care taken that no air bubbles pass into the measuring sensor.

After the programme start, in total approximately 1000 ion-exchanger beads are carefully added to the stirred vessel in portions of approximately 100 beads. Care must be taken to ensure that too many beads do not pass into the detector since this would lead to a falsification of the result. In addition, care must be taken to ensure that no bead agglomerates occur. A measurement generally takes 7 to 10 minutes.

Calculations
a) Automatic evaluation
   After the programme end an automatic evaluation proceeds with determination of the particle size distribution, the effective particle size and the uniformity coefficient
b) Manual evaluation
   A manual representation of the particle size distribution proceeds via plotting the volume percentages of the determined sieve fractions on a grain size grid (e.g. Selecta No. 421 1/2 A4, Schleicher & Schüll) and joining the individual plotted points to make a curve.

Abscissa: residue totals on the individual sieve in %
Ordinate: particle size in mm Against the curve obtained a straight line is placed which comes as close as possible to the original line segment. The intersections of these straight lines with the perpendiculars for 90 and 40% residue each give a value in mm.

The value for 90% residue is the effective particle size.

The value determined from the graph for 40% residue, divided by the effective particle size, gives the uniformity coefficient.

Determination of the Mercury Pore Volume

The pore volume is determined by Hg-porosimetry, in particular as specified in DIN 66135.

EXAMPLES

Example 1

1a) Production of the Monodisperse, Macroporous Polymer Beads Based on Styrene, Divinylbenzene and Ethylstyrene In a 10 l glass reactor, 3000 g of demineralized water are charged and a solution of 10 g of gelatin, 16 g of disodium hydrogenphosphate dodecahydrate and 0.73 g of resorcinol in 320 g of demineralized water were added and mixed. The mixture was heated to and maintained at 25° C. With stirring, subsequently, a mixture of 3200 g of microencapsulated monomer droplets having a narrow particle size distribution of 3.6% by weight of divinylbenzene and 0.9% by weight of ethylstyrene (used as commercially available isomeric mixture of divinylbenzene and ethylstyrene containing 80% divinylbenzene), 0.5% by weight of dibenzoyl peroxide, 56.2% by weight of styrene and 38.8% by weight of isododecane (technical isomeric mixture having a high proportion of pentamethylheptane) was added, wherein the microcapsules consisted of a formaldehyde-cured complex coacervate of gelatin and a copolymer of acrylamide and acrylic acid, and 3200 g of aqueous phase having a pH of 12 were added. The median particle size of the monomer droplets was 260 µm.

The batch was polymerized to completion with stirring by temperature elevation according to a temperature programme starting at 25° C. and ending at 95° C. The batch was cooled, washed over a 32 µm sieve and subsequently dried in a vacuum at 80° C. This produced 1893 g of a spherical polymer having a median particle size of 240 µm, a narrow particle size distribution and smooth surface.

The polymer had a chalky white appearance and has a bulk density of approximately 350 g/l.

1b) Production of the Amidomethylated Polymer Beads

At room temperature, 3855 g of dichloroethane, 875.4 g of phthalimide and 615.6 g of 29.6% strength by weight formalin were charged. The pH of the suspension was set at 5.5 to 6 using sodium hydroxide solution. Subsequently the water was removed by distillation. Then, 64.2 g of sulphuric acid were added. The resultant water was removed by distillation. The batch was cooled. At 30° C., 271.2 g of 65% strength oleum and subsequently 37.1 g of monodisperse polymer beads produced according to process step 1a) were added. The suspension was stirred for a further 2 hours at 30° C. Then, in the course of 30 minutes, a further 334.3 g of monodisperse polymer beads produced according to process step 1a) were added. The suspension was heated to 70° C. and stirred for a further 6.5 hours at this temperature. The reaction broth was taken off, demineralized water was added and residual amounts of dichloroethane were removed by distillation.

Yield of amidomethylated polymer beads: 2570 ml
Composition by Elemental Analysis:
Carbon: 73.6% by weight;
Hydrogen: 4.7% by weight;
Nitrogen: 6.1% by weight;
Remainder: oxygen.

1c) Production of the Aminomethylated Polymer Beads

In a reactor, 819.1 ml of 50% strength by weight sodium hydroxide solution were made up to a total volume of 3048 ml with demineralized water. To this were added 2540 ml of aminomethylated polymer beads from 1b) at room temperature. The suspension was heated in 2 hours to 180° C. and stirred for 8 hours at this temperature. The resultant polymer beads were washed with demineralized water.

Yield: 2100 ml
Composition by Elemental Analysis:
Nitrogen: 12.0% by weight
Carbon: 74.1% by weight;
Hydrogen: 8.1% by weight;
Oxygen: 4.8% by weight
Determination of the amount of basic groups: 2.33 mol/liter of resin From the elemental composition of the aminomethylated polymer beads it may be calculated that, on a statistical average per aromatic ring—originating from the styrene and divinylbenzene units—1.36 hydrogen atoms were replaced by aminomethyl groups.

1d) Production of a Chelating Resin Having Iminodiacetic Acid Groups

In a reactor, at room temperature 474 ml of demineralized water were charged. To this were added 450 ml of aminomethylated polymer beads from Example 1c). The suspension was heated to 90° C. Over the course of 4 hours, 408.7 grammes of 80% strength by weight aqueous chloroacetic acid were metered in. In this case, the pH of the suspension is kept at pH 9.2 by metered addition of 50% strength by weight sodium hydroxide solution. Subsequently, the suspension was heated to 95° C. The pH is adjusted to 10.5 by metered addition of sodium hydroxide solution. Stirring was carried out for 6 hours at 95° C. and pH 10.5. Thereafter, the batch was cooled. The resultant chelating resin was washed on a sieve with demineralized water.

Yield: 830 ml
Swelling factor ml of end product per gramme of feed polymer beads: 10.55
Nitrogen content: 5.3% by weight
Median bead diameter: 400µ
Amount of chelating groups (total capacity): 3.11 mol/l Penetrated mercury pore volume: 856 mm³/g
Porosity: 57%
Median pore diameter: 82 nm
Resin stability in the 200 cycle swelling stability test: 99% whole beads.

TABLE 1

Comparison of the dynamic absorption capacities for calcium of two chelating resins of the prior art and also the resin according to the invention; all three resins are chelating resins having iminoacetic acid groups

| Origin | Resin type | Dynamic absorption capacity for calcium in grammes per liter of chelating resin | End point of the calcium absorption of the chelating resin at calcium concentrations in the eluate of ppb | Decrease of the amount of calcium in the brine by the chelating resins down to residual amounts of calcium in ppb |
|---|---|---|---|---|
| DE 3 704 307 A1 | Iminodiacetic acid | 4.2 | >50 | 10 to 50 |
| U.S. Pat. No. 4,818,773 | Iminodiacetic acid | 7.1 | >500 | At 20 to 500 |
| According to the invention | Iminodiacetic acid | 18.5 | 20 | 1 to 20 |

Using a photometric process analyser, the calcium concentration in the filtered 30% strength NaCl solution was measured hourly. The experiment was ended when the calcium concentration in the filtrate markedly exceeded 20 μg of Ca/litre.

On the basis of the filter volume achieved at this timepoint and the known calcium feed concentration, what is termed the dynamic absorption capacity for calcium of a resin was determined in relation to these experimental conditions.
Result:

| Dynamic absorption capacity of calcium at the standard grain size | |
|---|---|
| (Ø0.65 mm ± 0.05 mm) | 8.2 g of Ca/liter |
| Dynamic absorption capacity for calcium of the fine grain size | |
| (Ø0.40 mm ± 0.05 mm) | 18.4 g of Ca/liter |

The fine-grained chelating resin according to the invention has a 2.2 times higher dynamic absorption capacity for calcium than the standard grain-size commercially available Lewatit° Monoplus TP208 according to EP 1 078 690 A2.

Example 2

Barium removal from a 30% strength sodium chloride solution using a chelating resin having iminodiacetic acid groups (median bead diameter 0.40 mm±0.05 mm) in comparison with a chelating resin having iminodiacetic acid groups (median bead diameter 0.65 mm±0.05 mm) as per EP 1 078 690 A2.
Experimental Description:
By means of a peristaltic pump, brine was continuously pumped over the ion exchangers of various grain sizes to be determined.
The subsequent experimental parameters were taken into account here:

| Feed concentration | 14 mg Ca/liter |
|---|---|
| Feed concentration | 1 mg Ba/liter |
| Feed pH | 8.2 |
| Feed rate | 20 BV/h |
| Column temperature | 60° C. |
| Breakthrough concentration | 20 μg Ca/liter |
| Amount of resin used | 100 ml |
| Resin form | Na form |

The experimental procedure proceeded as described in Example 2. Using a photometric process analyser, the barium concentration was measured hourly in the filtered 30% strength NaCl solution (BV=bed volumes).
Result:
The finely disperse chelate resin according to the invention having iminodiacetic acid groups (median bead diameter 0.40 mm±0.05 mm) reduces the concentration of barium ions in the eluate to values in the range 10 to 30 ppb.

The usual grain size chelate resin having iminodiacetic acid groups according to EP 1 078 690 A2 (median bead diameter 0.65 mm±0.05 mm) reduces the concentration of barium ions in the eluate to values in the range 100 to 70 ppb.

The finely disperse chelate resin according to the invention having iminodiacetic acid groups reduces the barium concentration in the sodium chloride brine much better down to significantly lower residual contents than the usual grain size chelate resin according to EP 1 078 690 A2.

Example 3

Calcium removal from a 30% strength sodium chloride solution using a chelating resin having iminodiacetic acid groups (median bead diameter 0.40 mm±0.05 mm) in comparison with a chelating resin having iminodiacetic acid groups as per EP 1 078 690 A2 (median bead diameter Ø0.65 mm±0.05 mm).
Experimental Description:
By means of a peristaltic pump, brine was continuously pumped over the ion exchangers of various grain sizes to be determined.
The subsequent experimental parameters were taken into account here:

| Feed concentration | 14 mg Ca/liter |
|---|---|
| Feed pH | 8.2 |
| Feed rate | 20 BV/h |
| Column temperature | 60° C. |
| Breakthrough concentration | 20 μg Ca/liter |
| Amount of resin used | 100 ml |
| Resin form | Na form |

See FIG. 1 for experimental structure:
A=brine reservoir vessel 300 g of NaCl/litre; 400 litres capacity
B=brine reservoir vessel 300 g of NaCl/litre; 400 litres capacity
C=peristaltic pump D=TIC (70° C.)
E=ADI (calcium titration)
F=waste water
G=QIR
H=LIC
J=brine mixing vessel 600 litres
K=heatable prefilter (operating temperature 70° C.)
L=heatable filter columns (operating temperature 60° C.)
M=brine transfer beaker/brine was transferred by means of a peristaltic pump into the collecting vessel
TIC=temperature indicator controller
ADI=abbreviation for the ADI 2040 process analyser from Metrohm
QIR=quality indicator recorder (in this case Q is the Ca/Mg content in the filtrate)
LIC=standard indicator with controller Example 4

Comparison of the characteristic data of the 2 chelating resins used in Examples 4 and 5 having iminoacetic acid groups

TABLE 2

| Characteristic data | Chelating resin according to the invention having a median bead diameter 400 μ | Chelating resin having a median bead diameter 650 μ according to EP 1 078 690 A2 |
| --- | --- | --- |
| Swelling factor ml of end product per gramme of feed polymer beads | 10.55 | 9.2 |
| Median bead diameter in μ | 400 | 650 |
| Amount of chelating groups (total capacity) in mol/l | 3.11 | 2.39 |
| Penetrated mercury pore volume in mm³/g | 856 | 558 |
| Porosity: in % | 57 | 47 |
| Median pore diameter in nm | 82 | 67 |
| Resin stability in the 200 cycle swelling stability test in % whole beads | 99 | 98 |
| First substitution | 1.28 | — |
| Dynamic absorption capacity for calcium in grammes of calcium per liter of chelating resin | 18.4 | 8.2 |
| Loading duration of the chelating resin until the amount of calcium in the filtrate exceeds 20 ppb: in hours | 55.6 | 28 |
| Reduction of the concentration of barium ions in the eluate to | values in the range from 10 to 30 ppb | values in the range from 100 to 70 ppb |
| Second substitution | 1.90 | 1.8 |

The chelating resin having a median bead diameter of 400μ exhibits, compared with the chelating resin having a median bead diameter of 650μ, a markedly higher total capacity and also exceptionally high values in the pore volume, the porosity and the pore diameter without showing losses in resin stability. In addition, the chelating resin having a median bead diameter of 400μ, compared with the chelating resin having 650μ, shows a calcium absorption capacity which is 120% higher, and also a chelating resin loading time in hours until the amount of calcium in the filtrate exceeds 20 ppb which is prolonged by 99%. In addition, the fine-bead chelating resin reduces the barium concentrations in the brine to significantly lower residual values.

Example 5

Increased regeneration efficiency of a chelating resin having iminodiacetic acid groups (median bead diameter 0.40 mm±0.05 mm) and loaded with calcium compared with a chelating resin having iminodiacetic acid groups according to EP 1 078 690 A2 (median bead diameter Ø 0.65 mm±0.05 mm).

The two calcium ion-loaded chelating resins in Example 4 were eluted from the top with 2 bed volumes of 7.5% strength by weight hydrochloric acid for detaching the calcium—and other divalent cations (regeneration) over the course of 2 hours and then eluted from the top with 4 bed volumes of demineralized water. Thereafter, for converting the chelating resin from the free acid into the sodium form, it was treated with 2000 ml of 4% strength by weight aqueous sodium hydroxide solution and then eluted with 2 bed volumes of demineralized water.

The two chelating resins regenerated in this way were again used, as described in Example 4, for removing calcium ions from sodium chloride brines.

Result:

| Dynamic absorption capacity for calcium of standard grain size | |
| --- | --- |
| (Ø 0.65 mm ± 0.05 mm) | 8.3 g of Ca/liter |
| Dynamic absorption capacity for calcium of the fine grain size | |
| (Ø 0.40 mm ± 0.05 mm) | 21.4 g of Ca/liter |

The fine grain size chelating resin according to the invention, after it was regenerated with the same amount of regeneration acid (hydrochloric acid) as the usual grain size of chelating resin, showed a virtually three-fold higher dynamic absorption capacity for calcium than the starting product.

The same amount of hydrochloric acid therefore, in the case of the fine grain size chelating resin, detached more than twice the amount of calcium compared with the standard grain size according to EP 1 078 690 A2 and thereafter (that is after regeneration) the fine grain size chelating resin was again able to remove even more than the original amount of calcium ions from sodium chloride brine!

What is claimed is:

1. A method for producing monodisperse ion exchangers having chelating functional groups represented by the structural formula (I)

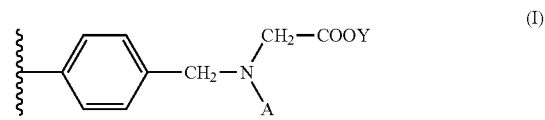

where ～～ is the polymer backbone and Y is hydrogen, sodium or potassium and A is hydrogen, $CH_2COOH$, $CH_2COONa$ or $CH_2COOK$, comprising the steps of:
a) forming monodisperse crosslinked polymer beads via reacting monomer droplets of at least one monovinylaromatic compound, at least one polyvinylaromatic compound, at least one porogen and at least one initiator or an initiator combination, wherein a jetting process and/or the seed-feed process is employed,
b) phthalimidomethylating the monodisperse crosslinked polymer beads with phthalimide derivatives present in inert solvent and comprising an $SO_3$ adduct, wherein said phthalimidomethylating comprises introducing a subportion of from 1 to 15% by weight of the monodisperse crosslinked polymer beads into the $SO_3$ adduct and stirring at a temperature of less or equal to 35° C. from 1 to 15 hours, wherein the amount of free $SO_3$ is from 0.28 to 0.5 mol based on 1 mol of phthalimide and thereafter introducing the residual amount of the monodisperse crosslinked polymer beads into the $SO_3$ adduct at a temperature of from 30 to 75° C., thereby forming phthalimidomethylated polymer beads, c) converting the phthalimidomethylated polymer beads to aminomethylated polymer beads, and d) reacting the aminomethylated polymer beads to introduce chelating groups, thereby forming said monodisperse ion exchangers having chelating functional groups represented by the structural formula (I).

2. The monodisperse ion exchangers having chelating functional groups formed by the method according to claim 1.

3. The monodisperse ion exchangers having chelating functional groups according to claim 2, further having a total capacity of from 2.7 to 3.2 mol/l and having a median pore diameter of from 75 to 90 nm.

4. A method for the adsorbtion of metals from aqueous solutions and organic liquids comprising: contacting the aqueous solutions and the organic liquids with the chelating exchangers according to claim 2, whereby the metals are absorbed.

5. The method according to claim 4, wherein the metals are selected from the group consisting of alkaline earth metals, heavy metals, noble metals, and combinations thereof.

6. The method according to claim 4, wherein the aqueous solutions are solutions of alkaline earth metals, solutions of alkali metals, or brines for alkali metal chloride electrolysis.

7. The method according to claim 4, wherein the metals are alkaline earth metals from brines employed for alkali metal chloride electrolysis.

8. The method according to claim 5, wherein the heavy metals and noble metals are selected from the group consisting of mercury, iron, cobalt, nickel, copper, zinc, lead, cadmium, manganese, uranium, vanadium, elements of the platinum group, gold, and silver.

9. The method according to claim 4, wherein the alkaline earth metals are selected from the group consisting of the metals magnesium, calcium, strontium, and barium.

* * * * *